Figure 1:
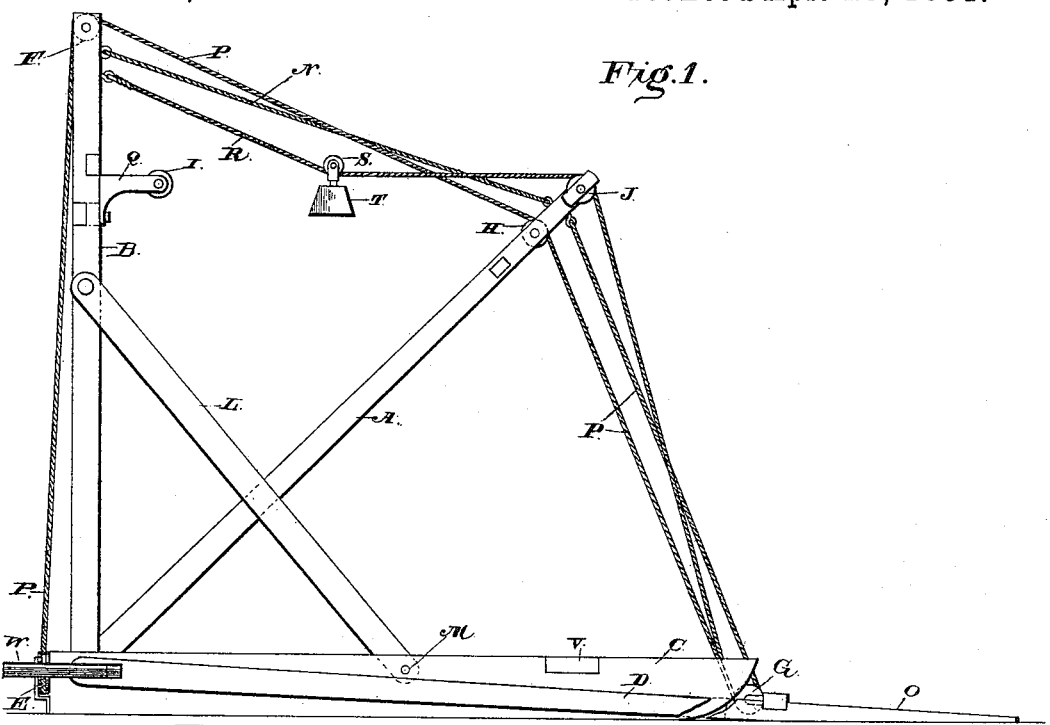

(No Model.) 2 Sheets—Sheet 1.

C. W. HAM.
HAY RICKER.

No. 451,045. Patented Apr. 28, 1891.

Witnesses
M. Fowler
N. L. Collamer

Inventor
Charles W. Ham
By his Attorneys,
C. A. Snow & Co.

(No Model.) 2 Sheets—Sheet 2.
C. W. HAM.
HAY RICKER.
No. 451,045. Patented Apr. 28, 1891.
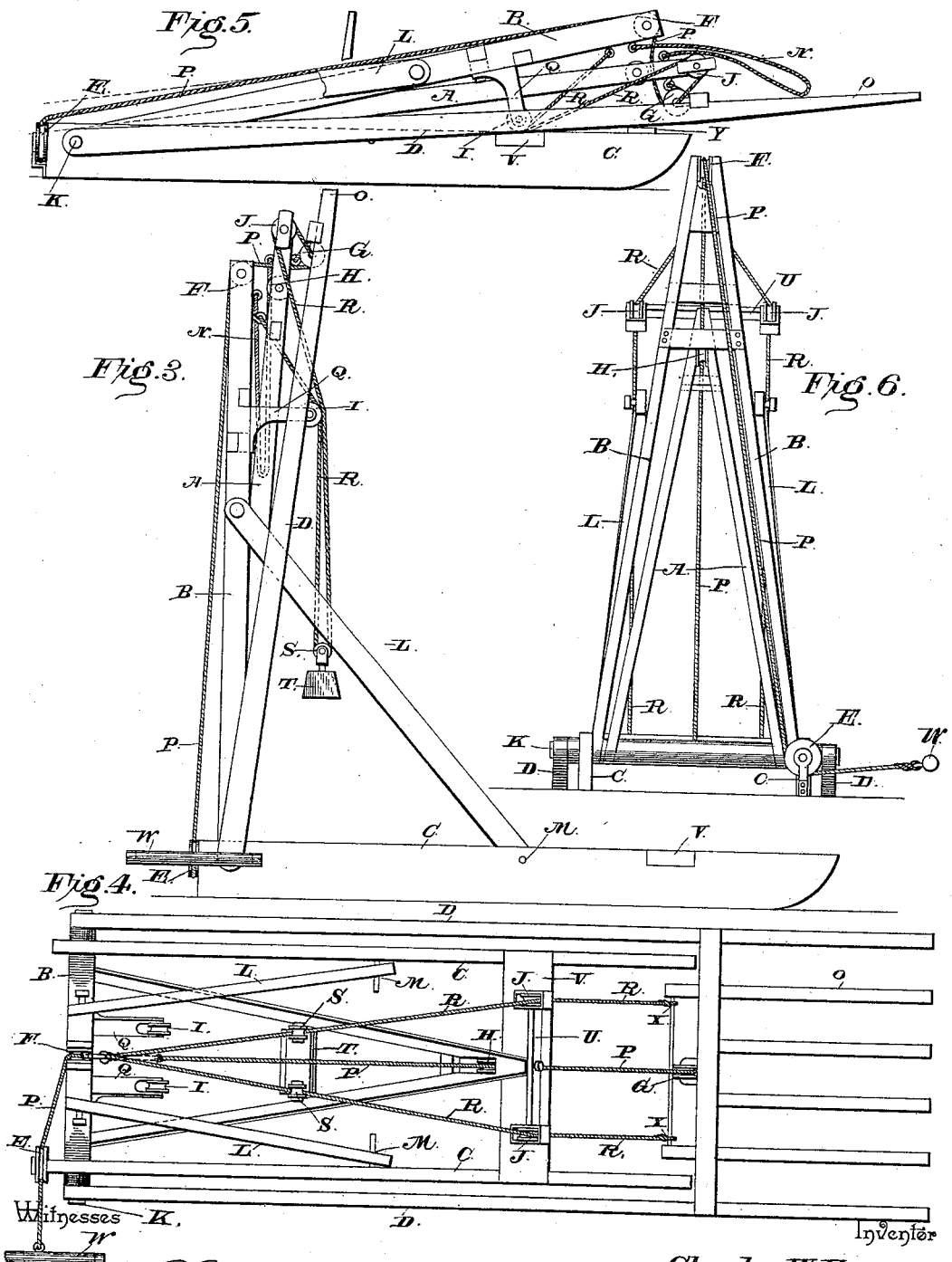
Witnesses  Inventor
Charles W. Ham
By his Attorneys,

UNITED STATES PATENT OFFICE.

CHARLES W. HAM, OF CANAANVILLE, OHIO.

HAY-RICKER.

SPECIFICATION forming part of Letters Patent No. 451,045, dated April 28, 1891.

Application filed November 29, 1890. Serial No. 372,988. (No model.)

*To all whom it may concern:*

Be it known that I, CHARLES W. HAM, a citizen of the United States, residing at Canaanville, in the county of Athens and State of Ohio, have invented a new and useful Hay-Ricker, of which the following is a specification.

This invention relates to devices for hoisting hay, commonly known as "hay-rickers;" and the object of the same is to provide improvements in devices of this character.

To this end the invention consists in the details of construction hereinafter more fully described and claimed, and as illustrated in the drawings, in which—

Figure 2:
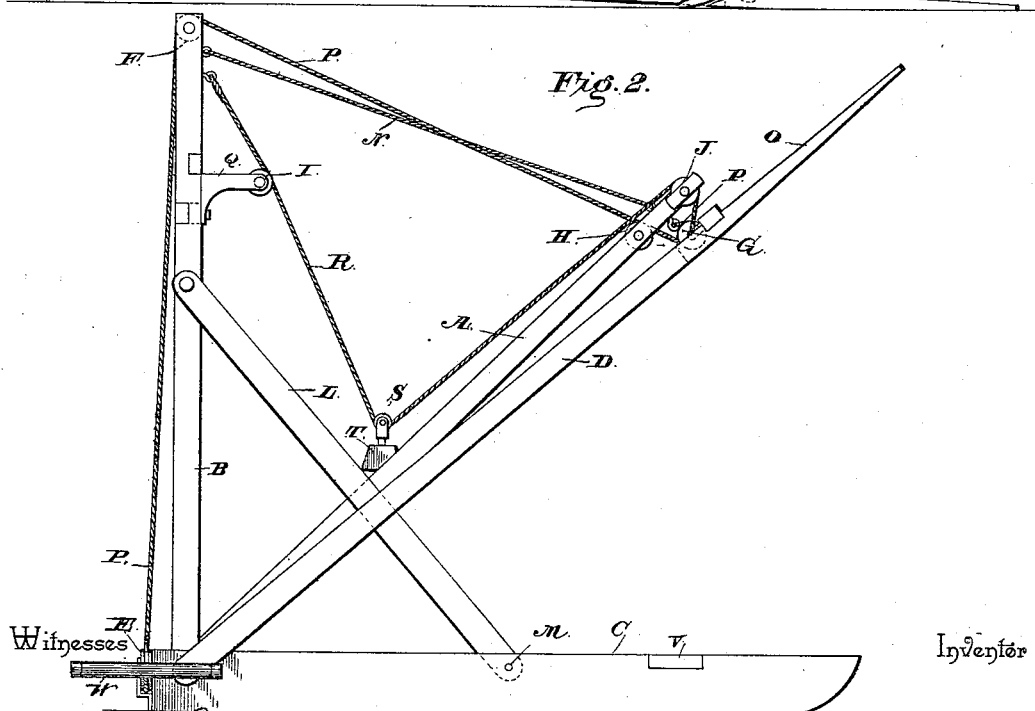

Figure 1 is a side elevation of this device in position to lift the hay. Fig. 2 is a similar view with the hay partly lifted. Fig. 3 is a similar view with the pitcher raised to its highest point. Fig. 4 is a plan view of Fig. 1. Fig. 5 is a side elevation of the device in folded position and ready for transportation. Fig. 6 is an elevation of the device shown in Fig. 1 when viewed from the rear end.

Referring to the said drawings, the letter C designates the supporting-base, which may be a wagon or a sled, as shown in the present instance. Pivotally mounted on a horizontal bolt K through one end of said sled is a pair of uprights B, which converge, as shown in Fig. 6, and are connected at their upper ends, a pulley F being there located. Also pivotally mounted on said bolt K is a pair of bars A, which converge toward their free ends, where they are connected and provided with pulleys H and J, the whole constituting an inclined brace.

L L are braces pivotally connected at their upper ends to the uprights B and detachably connected at their lower ends, as at M, to the base, and by these braces the uprights are sustained in about a vertical position. The inclined brace A is maintained normally in the position seen in Fig. 1 by a retaining-rope N, connecting the upper ends of the uprights B and the brace A.

Pivotally mounted outside the base C upon the ends of the bolt K are long arms D, which are connected across the front end of the base and constitute the pitcher, the free or front end of this pitcher being provided with a fork O, as best seen in Fig. 4.

P is the main operating or pulling rope, which leads from a whiffletree W over a pulley E on the rear end of the base, up along the upright B to and over the pulley F, thence out over the pulley H in the upper end of the inclined brace, thence down and around a pulley G carried by the fork, and, returning upwardly, is secured to the end of the inclined brace A. When this rope is drawn upon by a horse or a team of horses to raise the hay that may be then upon the fork O, it will be obvious that the first motion will raise the pitcher from the position shown in Fig. 1 to that shown in Fig. 2 with considerable ease, the pulley G giving the horse double power. Although I have not illustrated it, there might be more than one pulley each at G and H, in order that the power of the horse might be greatly multiplied during this portion of the motion, where the weight of the load is lifted almost straight upward. The second portion of the motion will draw the fork against the end of the inclined brace, and will then draw both the pitcher and the brace upwardly against the upright to the position shown in Fig. 3. As the first part of the motion gave double power to the horse, the speed at which the load was raised was correspondingly decreased; but as the remaining portion of the motion is a direct pull without any increase of power the speed at which the fork moves from the position of Fig. 2 to that of Fig. 3 will be increased. As a result, when the brace A and the pitcher D strike the upright B, the hay will be thrown from the fork O with considerable force, as is desirable in devices of this character.

The upright B carries a pair of arms Q, each having a pulley I in its outer end, and from the upper end of the upright ropes R lead under pulleys S, which are connected to a weight T, thence over pulleys J, supported by a cross-bar U at the free end of the inclined brace A, and are connected to the fork O at points X, which are spaced the same distance as the pulleys J. As the pitcher moves upwardly the cords R are obviously slackened and the weight T descends. As the pitcher reaches the position of Fig. 2 the descent of the weight ceases, and as the brace and pitcher move from that position to the position of Fig. 3 the cords R strike the pulleys I, so that the weight T is raised slightly from their lowest position just as the pitcher completes its motion.

When the tension on the rope P is relaxed, the weight will move the brace and the pitcher from the position shown in Fig. 3 until they pass beyond a point where they are balanced or nearly balanced upon the bolt K, so that their own weight will be sufficient to cause them to automatically return to the position of Fig. 1 in order to receive another load. When the brace A reaches its normal position, as shown in Fig. 1, and the rope N retains it there, the further downward movement of the pitcher will draw upon the weight-ropes R, thereby raising the weight, and in this manner a sudden fall of the pitcher will be prevented. This weight will also assist the horse in the first movement and direct lift of the load above described. It will be obvious that the pitcher D needs no brace to prevent its racking, because the inclined brace A serves that purpose. By disconnecting the lower ends of the upright braces L from the base C at the point M the uprights B can be let down, as shown in Fig. 5. As the inclined brace A is supported from the upright by a rope N, when the upright is lowered the brace will of course move with it. In its folded position the ends of the arms Q bear upon a cross-piece V of the base, and the pitcher is held above the ground by any suitable means, as a bar Y inserted beneath the pitcher across the base.

What is claimed as new is—

In a hay-ricker, the combination, with a base, a transverse bolt therethrough, a pitcher, and an inclined brace pivotally mounted on said bolt, an upright rising from said base, and an operating-rope leading over a pulley on the base, over a pulley at the top of the upright, over a pulley at the upper end of the brace, over a pulley on the pitcher, and connected to the end of the brace, of arms Q, projecting from the upright, pulleys I in their outer ends, a cross-bar on the upper end of the inclined brace, having pulleys in its ends, a rope connecting the upright and brace, a weight T, having pulleys S, and ropes R, leading from a point on the upright through the pulleys S, over the pulleys at the ends of the cross-bar, and connected to the pitcher, the whole adapted to operate substantially as described.

In testimony that I claim the foregoing as my own I have hereto affixed my signature in presence of two witnesses.

CHARLES W. HAM.

Witnesses:
GEO. R. WALKER,
D. C. CORNWELL.